United States Patent [19]

Tomotsu

[11] Patent Number: 5,010,151

[45] Date of Patent: Apr. 23, 1991

[54] METHOD FOR PREPARING ETHYLENE POLYMERS

[75] Inventor: Norio Tomotsu, Ichihara, Japan

[73] Assignee: Idemitsu Petrochemical Co., Ltd., Tokyo, Japan

[21] Appl. No.: 581,196

[22] Filed: Sep. 11, 1990

Related U.S. Application Data

[63] Continuation of Ser. No. 314,173, Feb. 23, 1989, abandoned, which is a continuation of Ser. No. 130,020, Dec. 8, 1987, abandoned.

[30] Foreign Application Priority Data

Dec. 10, 1986 [JP] Japan ............................. 61-292462

[51] Int. Cl.$^5$ ...................... C08F 4/24; C08F 10/02
[52] U.S. Cl. ................... 526/105; 502/114; 502/115; 502/117; 526/99; 526/101
[58] Field of Search .............................. 526/105

[56] References Cited

U.S. PATENT DOCUMENTS

| | | | |
|---|---|---|---|
| 2,969,348 | 1/1961 | Fawcett | 526/106 |
| 3,476,724 | 11/1969 | Hogan et al. | 526/105 |
| 3,715,321 | 2/1973 | Horvath | 526/106 |
| 4,374,234 | 2/1983 | Strickland et al. | 526/105 |
| 4,376,720 | 3/1983 | Sakurai et al. | 526/105 |

FOREIGN PATENT DOCUMENTS

| | | | |
|---|---|---|---|
| 15407 | 1/1984 | Japan | 526/97 |
| 1505818 | 3/1978 | United Kingdom | 526/106 |
| 2048284 | 12/1980 | United Kingdom | 526/101 |

*Primary Examiner*—Edward J. Smith
*Attorney, Agent, or Firm*—Antonelli, Terry, Stout & Kraus

[57] ABSTRACT

A method of preparing ethylene polymers which comprises polymerizing ethylene, or ethylene and one or more α-olefins other than ethylene in the presence of a composite catalyst which catalyst comprises:

(A) a solid composition prepared by depositing one or more chromium compounds and one or more metal compounds other than said chromium compounds onto an inorganic oxide support material and then calcining the resulting solid; and (B) one or more organometallic compounds that are each independently represented by the following general formula:

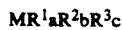

$$MR^1{}_aR^2{}_bR^3{}_c$$

wherein M is a metal of Group I, II or III of the periodic table and the $R^1$, $R^2$ and $R^3$ moieties are each independently hydrogen, a hydrocarbon radical of $C_1$–$C_{14}$, or an alkoxy group of $C_1$–$C_{14}$ with the proviso that the case that all the moieties are each equally hydrogen is excluded; and, a, b and c are each independently a real number of not less than zero with the proviso that the sum of numbers a, b and c is equal to the formal valence of metal M.

16 Claims, No Drawings

METHOD FOR PREPARING ETHYLENE POLYMERS

This application is a continuation of application Ser. No. 314,173, filed Feb. 23, 1989, now abandoned which is a continuation of application Ser. No. 130,020, filed Dec. 8, 1987 (now abandoned).

BACKGROUND OF THE INVENTION (1) Field of the Invention

The present invention relates to an improved method for preparing ethylene polymers. More particularly, the present invention relates to an industrially advantageous method for preparing, homopolymers of ethylene or copolymers of ethylene and one or more α-olefins other than ethylene by using a specified Phillips-type catalyst having a particularly high catalytic activity for the polymerization and a very short induction period of the polymerization.

(2) Description of the Related Art

There are many methods or processes for the polymerization of ethylene; i.e., high pressure polymerization processes, medium pressure polymerization processes, low pressure polymerization processes, radiation polymerization methods, etc. It is well known that Phillips catalysts or Standard Oil catalysts are employed for the medium pressure processes, while Ziegler catalysts are used for the low pressure processes. The Phillips catalysts used in the medium pressure processes are each usually prepared by depositing a chromium compound such as chromium oxide, onto an inorganic oxide support such as silica, silica-alumina, and then calcining the resulting solid in air. A solvent having a suitable boiling point is usually used in the polymerization of ethylene over these catalysts.

As a matter of fact, such polymerization processes in which the Phillips catalysts are employed have such disadvantages as follows:

The averaged molecular weight of the polymers obtained as well as the activity of the catalysts used in the processes greatly depends on the temperature of the polymerization; therefore, it is generally necessary to conduct the polymerization at a temperature of about 100° to 200° C. in order to attain a sufficiently high catalytic activity for the purpose of the production of polyethylenes having an averaged molecular weight of about tens of thousands to hundreds of thousands and being useful in a variety of fields of utilization. However, the polymerization in such a temperature range makes it difficult to increase the concentration of the polymers in the product mixture to a value of not less than about 20% by weight, since the dissolution of the polymers produced into the solvent used causes a sharp increase in the viscosity of the product solution as a result. It has, therefore, been required to develop a suitable catalyst having a sufficiently high catalytic activity especially at temperatures of not higher than about 105° C. because, at such low temperatures, the polymerization can be effectively operated by means of a so-called slurry polymerization technique.

Accordingly, with the intention of improving the activity of Phillips catalysts, many catalysts including those that can be obtained by the combination of Phillips catalysts with organoaluminium compounds, organozinc compounds or the like have been developed (Japanese Patent publication Nos. 22144/1961, 27415/1968, 34759/1974, Japanese Patent Laid-open No. 101477/1973, etc.).

Nevertheless, the activities of these catalysts for the polymerization are still insufficient.

Some catalysts obtained by the modification of Phillips catalysts with organomagnesium compounds are disclosed in Japanese Patent Laid-open No. 120713/1981; however, these catalysts have disadvantages in that they show a long induction period of the polymerization and have a low stability in the polymerization, although they have improved catalytic activities for the polymerization.

Furthermore, a process for the polymerization of ethylene characterized by conducting the prepolymerization of ethylene by using a Phillips catalyst and then polymerizing further ethylene in the presence of the resulting reaction mixture comprising of the catalyst used and the prepolymer produced is disclosed in Japanese Patent Laid-open No. 106610/1986. However, this process has such a disadvantage in that the catalytic activity is still insufficient, although the induction period of the polymerization is rather short.

SUMMARY OF THE INVENTION

It is an object of the present invention to provide an industrially superior method for preparing ethylene polymers; i.e., homopolymers of ethylene or copolymers of ethylene and one or more α-olefins other than ethylene by the use of an improved Phillips-type catalyst having a high catalytic activity for the polymerization, a short induction period of the polymerization and a superior stability in the polymerization.

As the result of our researches to attain the above object, we have eventually found that the object can be attained by a method for preparing ethylene polymers by conducting the polymerization by the use of a composite catalyst obtained by the combination of a specified organometallic compound and a solid composition prepared by depositing a specified compound onto an inorganic oxide support and then calcining the resulting solid. Based on the findings, we have completed the present invention.

That is to say, the present invention provides a method for preparing ethylene polymers which comprises polymerizing ethylene, or ethylene and one or more α-olefins other than ethylene in the presence of a composite catalyst which catalyst comprises:

(A) a solid composition prepared by depositing one or more chromium compounds and one or more metal compounds other than said chromium compounds onto an inorganic oxide support material and then calcining the resulting solid; and (B) one or more organometallic compounds that are each independently represented by the following general formula:

$$MR^1_a R^2_b R^3_c$$

wherein M is a metal of Group I, II or III of the periodic table and the $R^1$, $R^2$ and $R^3$ moieties are each independently hydrogen, a hydrocarbon radical of $C_1$–$C_{14}$, or an alkoxy group of $C_1$–$C_{14}$ with the proviso that the case that all the moieties are each equally hydrogen is excluded; and, a, b and c is each independently a real number of not less than zero with the proviso that the sum of numbers a, b and c is equal to the formal valence of metal M.

DESCRIPTION OF THE PREFERRED EMBODIMENTS

The inorganic oxide support materials used for the preparation of the solid compositions that are used in obtaining the composite catalysts employed in the present invention may each be an oxide of an elements of Group II, III or IV of the periodic table, or a mixed oxide containing at least one of the elements of the groups. Typical examples of the oxides of the elements of Groups II, III and IV may be MgO, CaO, $B_2O_3$, $SiO_2$, $SnO_2$, $Al_2O_3$ and the like. On the other hand, typical of some of the mixed oxides may be $SiO_2$—$Al_2O_3$, $SiO_2$—MgO, $SiO_2$—$TiO_2$, $SiO_2$—$V_2O_5$, $SiO_2$—$Cr_2O_3$, $SiO_2$—$TiO_2$—MgO etc. The oxides and the mixed oxides may be used each independently, or by combining at least two of the oxides, or by combining at least two of the mixed oxides, or by combining at least one of the oxides and at least one of the mixed oxides.

The suitable chromium compounds that may be used for one or more components supported on the respective support material include oxides of chromium such as chromium trioxide, and compounds that can at least partially be converted to chromium oxides by calcination, such as halides of chromium, oxyhalides of chromium, nitrates of chromium, sulfates of chromium, carbonates of chromium, acetates of chromium, oxalates of chromium alcholates of chromium; typical examples of the suitable compounds include chromyl chloride, potassium bichromate, ammonium chromate, chromium nitrate, chromium sulfate, chromium carbonate, chromium acetate, chromium oxalate, chromium acetylacetonate, di-tert-butyl chromate, etc. These chromium compounds may be used each independently or by combining at least two of them.

The metal compounds other than the chromium compounds which metal compounds may be used for one or more additional components supported with at least one of the above chromium compounds on the respective supports may be a variety of metal compounds, and the preferable metal compounds include, for example, the compounds of a metal of Group IA, IIA, IIIA or VIII of the periodic table. Suitable forms of these metal compounds may be, for example, halides, hydroxides and acetates.

Typical examples of the metal compounds include compounds of the Group IA metals, such as potassium chloride, potassium hydroxide, sodium chloride, sodium hydroxide, compounds of the Group IIA metals, such as magnesium chloride, magnesium hydroxide, magnesium acetate, calcium chloride, compounds of the Group IIIA metals, such as aluminum chloride, and compounds of the Group VIIIA metals, such as nickel chloride, cobalt chloride, iron chloride, etc.

A suitable molar ratio of the total of the metal compounds used to the total of the above chromium compounds used may be usually from 0.1 to 10, preferably from 0.1 to 5. If this ratio is less than 0.1, the activity of the catalysts obtained is insufficient and the induction period of the polymerization is long. On the other hand, if it is in excess of 10, the catalytic activity is also insufficient.

The deposition of the above chromium compounds and the metal compounds other than the chromium compounds onto the inorganic oxide supports can be done by known techniques; i.e., impregnation techniques, solvent-evaporation techniques, sublimation-adsorption techniques, etc. The suitable amount of the total of the chromium compounds deposited onto the support may be an amount corresponding to a chromium content of usually from 0.05 to 5% by weight of the total chromium atoms, preferably from 0.2 to 2% by weight of the total chromium atoms based on the sum of the weight of the support used and that of the total chromium compounds used.

The calcination for activating the solid compositions to obtain the precursors of the composite catalysts can be conducted by heating the solid compositions at a temperature of not less than 300° C., preferably at a temperature in the range of 400° to 900° C. for several minutes to tens of hours, preferably for 300 minutes to 10 hours in the presence of oxygen, preferably in the presence of the air which is actually free from moisture.

It is desirable that the calcination for the activation is operated by means of fluidized-bed techniques by blowing dry air. Of course, further improvement in the catalytic activity for the polymerization and other modifications of the polymerization catalysts for the purpose of, for example, the regulations of the molecular weight of the polymers produced can also be done by known techniques, for example, by the addition of one or more titanates, one or more salts containing fluorine or the like, to the solid catalyst precursors in the preparation of the catalysts or in the calcination.

The organometallic compounds that may be used as component(B) in obtaining the composite catalysts employed in the present invention may be represented by the following general formula:

$$MR^1_a R^2_b R^3_c \qquad (I)$$

wherein M, $R^1$, $R^2$, $R^3$, a, b, and c have the same meanings as described above, respectively.

Suitable metal element M can be, for example, magnesium, beryllium, boron, aluminium, zinc and lithium.

Suitable hydrocarbon radicals in the above general formula (I) may each independently be an alkyl, a cycloalkyl, an aryl, alkoxy radicals, etc. Typical examples of suitable hydrocarbon radicals may be methyl, ethyl, ethyl-butyl, propyl-butyl, amyl, hexyl, decyl, cyclohexyl, phenyl, methoxy, ethoxy and butoxy radicals.

These organometallic compounds may be used each independently or by combining at least two of the organometallic compounds. Especially preferable organometallic compounds include those that can be obtained by mixing or combining at least one of alkylmagnesiums and at least one of alkylboranes. A suitable molar ratio of the alkylmagnesiums used to the alkylboranes used may be from 0.1 to 20, preferably from 0.5 to 10. If this molar ratio is in the above range, the catalytic activity is extremely high and the induction period of the polymerization is hardly observed.

Suitable molar ratio of the total of the organometallic compounds to the total of the chromium compounds for obtaining the desired composite catalysts in the present invention is usually from 1 to 10,000, preferably 2 to 200. If this molar ratio is not in the above range, the activity of the catalysts obtained is insufficient.

In the method of the present invention, the polymerization of ethylene or the copolymerization of ethylene and at least one of α-olefins other than ethylene is conducted in the presence of one of the above composite catalysts. The α-olefins other than ethylene used for the copolymerization with ethylene may be represented by the following general formula:

$$R^4—CH=CH_2 \quad (II)$$

wherein $R^4$ is a $C_1$-$C_{20}$ alkyl or a $C_1$-$C_{20}$ cycloalkyl. Typical examples of the α-olefins include linear monoolefins such as propylene, butene-1, pentene-1 and octene-1, and branching monoolefins such as 4-methyl-1-pentene, and vinyl cyclohexene, and the like. These α-olefins may be used each separately or by combining at least two of them for the copolymerization with ethylene. The copolymers obtained may be random copolymers or block copolymers. Furthermore, in the copolymerization, other unsaturated compounds such as conjugated dienes and monoconjugated dienes, may also be used as comonomers.

For the polymerization in the method of the present invention, it is possible to employ known techniques and conditions that have conventionally been employed in the polymerization of olefins. Suitable polymerization techniques include for example, slurry polymerization or suspended polymerization techniques, vapor phase polymerization techniques, bulk polymerization techniques. Among these polymerization techniques, the slurry polymerization techniques are especially preferable.

Suitable solvents that may be used in the polymerizations by means of such techniques include, for example, aliphatic hydrocarbons such as propane, butane, pentane, hexane and heptane, cyclic hydrocarbons such as cyclohexane and methyl cyclohexane, aromatic hydrocarbons such as benzene, toluene and xylene, and mixtures thereof.

As described above, in the method of the present invention, it is possible to employ not only the polymerization techniques, such as solution polymerization techniques and slurry polymerization techniques, by which the polymerizations are conducted in the presence of the above solvent, but also vapor phase polymerization techniques or bulk polymerization techniques characterized in that liquid monomers may work also as a solvent in the polymerization.

Suitable temperatures of the polymerization can be selected from the temperatures in the range of usually 40° to 150° C., preferably 85° to 105° C., although they depend on the polymerization techniques used. Suitable pressures of the polymerization can be selected from the pressures in the range of 1 to 100 kg/cm²G, preferably 5 to 50 kg/cm²G.

Molecular weights of the polymers produced which molecular weights depend on reaction procedures, catalysts, polymerization conditions, etc., may be controlled by adding one or more suitable molecular regulators such as, hydrogen, alkyl halides, dialkylzincs to the reaction system.

The polymerization can be steadily and effectively conducted because the induction period is sufficiently short. The amount of the catalyst used in the polymerization can steeply be reduced even to such an amount that a process for removing the catalyst residue from the polymerization product is not necessary, and the polymerization can effectively be conducted at low enough pressures, because the activities of the catalysts used in the present invention are sufficiently high.

The homopolymers of ethylene and the copolymers of ethylene and one or more α-olefins other than ethylene obtained by the method of the present invention described above have improved properties; i.e., high densities, high softening points, high strength, etc., and are superior in various properties; i.e., powder morphology, melt tensile strength, etc., and can be suitably used for a variety of molding materials, preferably for blow molding.

EXAMPLES

The following examples are set forth to illustrate the present invention in more detail and are not limitative of the present invention.

Example 1

Synthesis of a solid composition (A)

Into 40 ml of distilled water were dissolved 0.25 g of chromium trioxide and 0.5 g of magnesium chloride, and with the resulting solution was impregnated 13 g of silica gel (Grade 952, produced by Fuji-Davidson Co., Ltd.) while stirring at room temperature for about one hour. The resulting slurry was dried by heating. Placed in a quartz tube, the resulting solid was further dried in flowing dry air at 150° C. for two hours, followed by air calcination at 800° C. for one hour to obtain a solid composition. The solid composition obtained had a chromium content of about 1% by weight.

Polymerization

To a 1.5 l autoclave inside which the air had been displaced with nitrogen by an evacuation-gas-introduction technique were introduced 50 mg of the solid composition (A), 0.25 mmol of butyl ethyl magnesium, 0.6 mmol of triethyl borane and 0.3 l of dehydrated, deoxygenated hexane. While maintaining the temperature inside the autoclave at 85° C., into the autoclave was introduced hydrogen in such an amount that the total pressure inside the autoclave was set to 5.4 kg/cm², and was introduced ethylene in such an amount that the total pressure inside the autoclave was increased to 9.4 kg/cm², and then, while maintaining the total pressure at 9.4 kg/cm², ethylene was polymerized for 2 hours. No induction period of the polymerization was observed and 97.2 g of a polymer was obtained. The catalytic activity for the polymerization was about 24.3 kg of polyethylene/(g-Cr.hr.atm). The intrinsic viscosity [η] of the polymer obtained was 4.0 dl/g. The results are shown in Table 1.

Comparative Examples 1 to 3, and Examples 2 to 10

The procedure of Example 1 was repeated, except that the conditions and the compounds shown in Table 1 were employed, respectively. The results are also shown in Table 1.

The properties shown in Table 1 were measured according to the following manners, respectively. Induction period: The induction period, which is defined as the period of time between the time when the introduction of ethylene into the autoclave is completed and the time when the consumption of ethylene starts, was measured by following the rate of the consumption of ethylene by means of a thermal gas meter. Intrinsic, viscosity [η]: The intrinsic viscosity of the polymers obtained was measured in decalin at 135° C.

TABLE 1

| Example | Comparative Example | Comparative Example | Comparative Example | Example | Example | Example | Example |
|---|---|---|---|---|---|---|---|

TABLE 1-continued

|  |  |  | 1 | 1 | 2 | 3 | 2 | 3 | 4 |
|---|---|---|---|---|---|---|---|---|---|
| Metal compound other than chromium compound | Kind | | $MgCl_2$ | — | — | $MgCl_2$ | $MgCl_2$ | $MgCl_2$ | $NiCl_2$ |
| | Molar ratio of the compound to the chromium compound | | 1 | — | — | 1 | 1 | 2 | 2 |
| (B) Organo-metallic compound | magnesium compound | kind | MgBuEt | MgBuEt | MgBuEt | $AlEt_3$ | MgBuEt | MgBuEt | MgBuEt |
| | | mmol | 0.6 | 0.6 | 0.6 | 0.6 | 0.3 | 0.6 | 0.6 |
| | boron compound | kind | $B(Et)_3$ | $B(Et)_3$ | — | — | $B(Et)_3$ | $B(Et)_3$ | $B(Et)_3$ |
| | | mmol | 0.25 | 0.25 | — | — | 0.5 | 0.25 | 0.25 |
| | Molar ratio of total organometallic compound to the chromium compound | | 85 | 85 | 60 | 60 | 80 | 85 | 85 |
| Polymerization conditions | Olefin | kind | ethylene | ethylene | ethylene | ethylene | ethylene | ethylene | ethylene |
| | | $kg/cm^2G$ | 4 | 4 | 4 | 4 | 4 | 4 | 4 |
| Result of the polymerization | Catalytic activity $kg-PE/(g-Cr \cdot hr \cdot atm)$ | | 24.3 | 10.6 | 10.7 | 2.1 | 17.5 | 25.1 | 14.5 |
| | Induction period | min | 0 | 0 | 25 | 30 | 0 | 0 | 0 |
| | $[\eta]$ | dl/g | 4.0 | 4.3 | 4.3 | 4.1 | 4.8 | 3.9 | 2.3 |

|  |  |  | Example 5 | Example 6 | Example 7 | Example 8 | Example 9 | Example 10 |
|---|---|---|---|---|---|---|---|---|
| Metal compound other than chromium compound | Kind | | $Mg(OCOCH_3)_2$ | $AlCl_3$ | KCl | $MgCl_2$ | $MgCl_2$ | $MgCl_2$ |
| | Molar ratio of the compound to the chromium compound | | 4 | 3 | 2 | 1 | 1 | 1 |
| (B) Organo-metallic compound | magnesium compound | kind | MgBuEt | MgBuEt | MgBuEt | $MgHx_2$ | MgBu(OEt) | MgBuEt |
| | | mmol | 0.6 | 0.6 | 0.6 | 0.6 | 0.6 | 0.6 |
| | boron compound | kind | $B(Et)_3$ | $B(Et)_3$ | $B(Et)_3$ | $B(Et)_3$ | $B(Et)_3$ | $B(Et)_3$ |
| | | mmol | 0.25 | 0.25 | 0.25 | 0.25 | 0.25 | 0.25 |
| | Molar ratio of total organometallic compound to the chromium compound | | 85 | 85 | 85 | 85 | 85 | 85 |
| Polymerization conditions | Olefin | kind | ethylene | ethylene | ethylene | ethylene | ethylene | ethylene hexene-1 |
| | | $kg/cm^2G$ | 4 | 4 | 4 | 4 | 4 | 4 5 ml |
| Result of the polymerization | Catalytic activity $kg-PE/(g-Cr \cdot hr \cdot atm)$ | | 20.8 | 12.1 | 14.3 | 24.5 | 24.1 | 20.8 |
| | Induction period | min | 0 | 0 | 0 | 0 | 0 | 0 |
| | $[\eta]$ | dl/g | 3.6 | 2.0 | 3.4 | 4.0 | 4.0 | 3.5 |

What is claimed is:

1. A method for preparing an ethylene polymer which comprises polymerizing ethylene, or ethylene and at least one α-olefin other than ethylene, at a temperature in the range of from 40° to 150° C., and at a pressure in the range of 1 to 100 kg/cm²G, in the presence of a composite catalyst, which catalyst consists essentially of:

(A) a solid composition prepared by depositing at least one chromium compound and at least one magnesium compound onto silica and then calcining the resulting solid, the at least one chromium compound deposited onto the silica being an amount corresponding to a chromium content of from 0.05 to 5% by weight of the total chromium atoms based on the sum of the weight of the silica and that of the total chromium compound, the magnesium compound being selected from the group consisting of a magnesium halide, magnesium hydroxide and magnesium acetate, and the molar ratio of the at least one magnesium compound to the at least one chromium compound being from 0.1 to 10; and (B) a mixture of an alkylmagnesium and an alkylborane each of which is being represented by the following general formula:

$MR^1{}_aR^2{}_bR^3{}_c$ wherein M is magnesium or boron and the $R^1$, $R^2$ and $R^3$ moieties are each independently hydrogen, an alkyl or cycloalkyl radical of $C_1$–$C_{14}$ or an alkoxy radical of $C_1$–$C_{14}$ with the proviso that the case that all the moieties are each equally hydrogen is excluded and the case that none of the moieties is an alkyl or cycloalkyl group of $C_1$–$C_{14}$ is excluded; and a, b and c are each independently a real number of not less than zero, with the proviso that the sum of the numbers a, b and c is equal to 2 or 3, the molar ratio of the alkylmagnesium to the alkylborane being from 0.1 to 20, and the molar ratio of the mixture of alkylmagnesium and the alkylborane to the at least one chromium compound being from 2 to 200.

2. The method of claim 1, wherein the chromium compound is selected from the group consisting of chromium trioxide, chromyl chloride, potassium bichromate, ammonium chromate, chromium nitrate, chromium sulfate, chromium carbonate, chromium acetate, chromium oxalate, chromium acetylacetonate and di-tert-butyl chromate.

3. The method of claim 1, wherein the at least one chromium compound is chromium trioxide.

4. The method of claim 1, wherein the magnesium halide is magnesium chloride.

5. The method of claim 1, wherein the α-olefin is selected from the group consisting of propylene, butene-1, pentene-1, hexene-1, octene-1, 4-methylpentene-1 and vinyl-cyclohexane.

6. The method of claim 1, wherein the α-olefin is hexene-1.

7. The method of claim 1, wherein the alkylborane is triethyl borane.

8. The method of claim 1, wherein the alkylmagnesium of (B) is selected from the group consisting of butyl ethyl magnesium, di-hexyl magnesium and butyl ethoxy magnesium.

9. A method for preparing an ethylene polymer which comprises polymerizing ethylene, or ethylene and at least one α-olefin other than ethylene, at a temperature in the range of from 40° to 150° C., and at a pressure in the range of 1 to 100 kg/cm²G, in the presence of a composite catalyst, which catalyst consists of:
(A) a solid composition prepared by depositing at least one chromium compound and at least one magnesium compound onto silica and then calcining the resulting solid, the at least one chromium compound deposited onto the silica being an amount corresponding to a chromium content of from 0.05 to 5% by weight of the total chromium atoms based on the sum of the weight of the silica and that of the total chromium compound, the magnesium compound being selected from the group consisting of a magnesium halide, magnesium hydroxide and magnesium acetate, and the molar ratio of the at least one magnesium compound to the at least one chromium compound being from 0.1 to 10; and
(B) a mixture of an alkylmagnesium and an alkylborane each of which is being represented by the following general formula:

$MR^1{}_aR^2{}_bR^3{}_c$ wherein M is magnesium or boron and the $R^1$, $R^2$ and $R^3$ moieties are each independently hydrogen, an alkyl or cycloalkyl radical of $C_1$–$C_{14}$ or an alkoxy group of $C_1$–$C_{14}$ with the proviso that the case that all the moieties are each equally hydrogen is excluded and the case that none of the moieties is an alkyl or cycloalkyl radical of $C_1$–$C_{14}$ is excluded; and a, b and c are each independently a real number of not less than zero, with the proviso that the sum of the numbers a, b and c is equal to 2 or 3, the molar ratio of the alkylmagnesium to the alkylborane being from 0.1 to 20, and the molar ratio of the mixture of the alkylmagnesium and the alkylborane to the at least one chromium compound being from 2 to 200.

10. The method of claim 9, wherein the chromium compound is selected from the group consisting of chromium trioxide, chromyl chloride, potassium bichromate, ammonium chromate, chromium nitrate, chromium sulfate, chromium carbonate, chromium acetate, chromium oxalate, chromium acetylacetonate and di-tert-butyl chromate.

11. The method of claim 9, wherein the at least one chromium compound is chromium trioxide.

12. The method of claim 9, wherein the magnesium halide is magnesium chloride.

13. The method of claim 9, wherein the α-olefin is selected from the group consisting of propylene, butene-1, pentene-1, hexene-1, octene-1, 4-methylpentene-1 and vinyl-cyclohexane.

14. The method of claim 9, wherein the α-olefin is hexene-1.

15. The method of claim 9, wherein the alkylborane is triethyl borane.

16. The method of claim 9, wherein the alkylmagnesium of (B) is selected from the group consisting of butyl ethyl magnesium, di-hexyl magnesium and butyl ethoxy magnesium.

* * * * *